US00RE48744E

(19) United States
(12) Reissued Patent
Niekamp

(10) Patent Number: US RE48,744 E
(45) Date of Reissued Patent: Sep. 21, 2021

(54) OBJECT LIFTING, PULLING AND DIGGING APPARATUS

(71) Applicant: Danuser LLC, Fulton, MO (US)

(72) Inventor: Gary J. Niekamp, Jefferson City, MO (US)

(73) Assignee: Danuser LLC, Fulton, MO (US)

(21) Appl. No.: 16/597,464

(22) Filed: Oct. 9, 2019

Related U.S. Patent Documents

Reissue of:
(64) Patent No.: 9,781,885
Issued: Oct. 10, 2017
Appl. No.: 14/993,559
Filed: Jan. 12, 2016

(51) Int. Cl.
*A01G 23/06* (2006.01)

(52) U.S. Cl.
CPC ..... *A01G 23/065* (2013.01)

(58) Field of Classification Search
CPC ..... A01G 23/06; A01G 23/062; A01G 23/065
See application file for complete search history.

(56) References Cited

U.S. PATENT DOCUMENTS 1,764,905 A * 6/1930 Standfuss ..... A01G 23/065 254/213
2,233,821 A * 3/1941 Ramer ..... A01G 23/062 294/111
2,322,926 A * 6/1943 Dorland ..... A01D 1/00 171/55
2,505,923 A * 5/1950 Taylor ..... A01G 23/065 254/132
2,535,054 A * 12/1950 Ernst ..... A01G 23/065 254/132
2,535,099 A * 12/1950 Slick ..... A01G 23/065 254/132
2,597,740 A * 5/1952 Lyle ..... A01G 23/065 254/128
2,663,952 A * 12/1953 Winget ..... A01G 23/06 254/132
RE23,895 E * 11/1954 Winget ..... A01G 23/06 172/699
3,057,599 A * 10/1962 Clatterbuck ..... A01G 23/065 24/463
3,116,048 A * 12/1963 Irwin ..... A01G 17/16 254/132

(Continued)

OTHER PUBLICATIONS http://www.starhilljawz.com.

(Continued)

*Primary Examiner* — Jeffrey L Gellner
(74) *Attorney, Agent, or Firm* — Foley & Lardner LLP

(57) ABSTRACT

An object lifting, pulling and digging apparatus has a pair of jaws that can be opened to enable positioning the jaws around a post, tree, and/or bush then closed around the post, tree, and/or bush. The jaws can then be raised to pull the post, tree, and/or bush from the ground. The jaws of the apparatus can also be closed and angled downwardly to drive the distal ends of the jaws into the ground, where the jaws can then be moved upwardly to dig the post, tree, and/or bush from the ground. The apparatus can easily be attached to a vehicle equipped with a universal quick attach hitch and having auxiliary hydraulics, for example, a "skid steer" type farm or construction vehicle.

20 Claims, 8 Drawing Sheets

(56) References Cited

U.S. PATENT DOCUMENTS 3,140,786 A * 7/1964 Clatterbuck ..... B66F 9/065 414/733
3,590,760 A * 7/1971 Boyd ..... A01G 23/085 144/24.13
3,991,799 A * 11/1976 Albright ..... A01G 23/091 144/336
RE30,153 E * 11/1979 Busch ..... A01G 23/08 144/4.1
4,703,968 A * 11/1987 LaBounty ..... B66C 1/64 294/106
4,993,914 A * 2/1991 Riddle ..... A01G 23/006 294/115
5,526,637 A * 6/1996 Leonard ..... A01G 23/062 254/132
5,822,893 A * 10/1998 Ostermeyer ..... B23D 17/00 30/134
6,010,294 A * 1/2000 Lyddon ..... A01G 23/06 37/302
7,228,880 B2 * 6/2007 Taillon ..... A01G 23/08 144/24.12
7,412,788 B2 * 8/2008 Schipp ..... E02F 3/965 294/106
8,544,946 B2 * 10/2013 Holden ..... B66F 9/065 254/30
8,561,325 B1 * 10/2013 Hegener ..... A01G 23/06 254/132
8,628,035 B2 * 1/2014 Ramun ..... E02F 3/965 241/101.73
8,646,709 B2 * 2/2014 Ramun ..... E02F 3/965 241/101.73
9,139,402 B2 * 9/2015 Dodge, IV ..... B66C 1/445
9,185,855 B2 * 11/2015 Humphrey ..... A01G 23/062
9,267,307 B2 * 2/2016 St-Yves ..... E04H 12/347
9,288,949 B1 * 3/2016 Basinger ..... A01G 23/06
9,518,405 B2 * 12/2016 Hull ..... E04H 17/265

OTHER PUBLICATIONS https://www.clfab.com/EZ-PULLER.html.
http://www.shavermfg.com/the-extractor.
http://www.berlon.com/ProductDetails/tabid/99/ProductID/45/skid_steer_tree_and_post_puller/.
http://arrowmhp.com/treepostpuller.php.
www.precisionmfg.com/extreme-tree-puller/.
http://www.landpride.com/products/635/stp15-series-treepost-puller.

* cited by examiner

OBJECT LIFTING, PULLING AND DIGGING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED PATENT APPLICATIONS*

*This application is a Broadening Reissue application of U.S. Pat. No. 9,781,885 which issued on Oct. 10, 2017 from U.S. patent application Ser. No. 14/993,559 filed Jan. 12, 2016, the contents of which are incorporated herein by reference in their entireties.*

FIELD

This disclosure pertains to a post, tree and/or bush pulling and digging apparatus. More specifically, this disclosure pertains to an apparatus having a pair of hydraulically actuated jaws that can be opened to enable positioning the jaws around a post, tree and/or bush, then closed around the post, tree and/or bush. The jaws can then be raised to pull the post, tree and/or bush from the ground. The jaws of the apparatus can also be closed and angled downwardly to drive the distal ends of the jaws into the ground, where the jaws can then be moved upwardly to dig the post, tree and/or bush from the ground. The apparatus can be easily attached to a vehicle equipped with a universal quick attach hitch and having auxiliary hydraulics, for example a "skid steer" type farm or construction vehicle.

BACKGROUND

There are currently available various different types of apparatus that can be operated to engage jaws of the apparatus around a post, tree, bush, etc., and then raised to pull the post, tree, bush, etc. from the ground. The jaws of the apparatus can also be moved to their closed positions and the closed jaws can then be driven into the ground beneath the post, tree, bush, etc. The jaws can then be raised to dig the post, tree, bush, etc. from the ground. These apparatus are designed to be attached to vehicles equipped with a universal quick attach hitch and having auxiliary hydraulics, for example "skid steer" type farm or construction vehicles. The constructions of and operations of these apparatus are basically the same.

Many of the currently available apparatus' lack replacement digging teeth and rely on the blunt ends of the jaws to dig beneath the object. In addition they do not allow for cutting of roots while digging. Due to this a larger vehicle is required to overcome the increased digging force required to excavate/break the tree roots if capable. If a larger vehicle is not available then the size of tree that is capable of removal is decreased.

Many of the these known pulling and digging apparatus have one stationary jaw and one moveable jaw. In operating this type of apparatus it can be difficult at times to center the pulling load relative to the vehicle to which the apparatus is attached. Additionally, the single moveable jaw with a side mounted actuator decreases the operating range of the jaw, limiting the size of the object that can be grasped.

Additionally, many of the current pulling and digging apparatus have an actuator for the moveable jaw that is positioned alongside the moveable jaw. This positioning of the actuator leaves the actuator exposed where the actuator can be damaged when digging with the apparatus.

Additionally, many of the current pulling and digging apparatus have opposing jaw surfaces that extend straight from the vehicle to which the apparatus is attached. These types of opposing jaw surfaces place limitations on the sizes of posts, trees, bushes, etc. that can be gripped between the opposing jaw surfaces. The posts, trees, bushes, etc. cannot be gripped close to the vehicle to which the apparatus is attached where the pulling and lifting power of the vehicle loader arms is greatest.

SUMMARY

The object lifting, pulling and digging apparatus of this disclosure has features that overcome many of the disadvantages associated with current pulling and digging apparatus. The apparatus can be easily attached by a universal quick attach hitch to the loader arms of a vehicle having an auxiliary hydraulic circuit. For example, the apparatus can be easily attached to the loader arms of a "skid steer" type vehicle.

The apparatus has a base with opposite front and rear surfaces. The rear surface of the base is removably attachable to the loader arms of a vehicle having an auxiliary hydraulic circuit.

A first jaw and a second jaw of the apparatus are attached to the front surface of the base. A first pin connects the first jaw to the front surface of the base for pivoting movement of the first jaw about the first pin between an open position and a closed position of the first jaw relative to the base. A second pin connects the second jaw to the front surface of the base for a pivoting movement of the second jaw about the second pin between an open position and a closed position of the second jaw relative to the base. The first pin and the second pin are positioned on the base in a single, generally vertical plane. The first jaw extends from the first pin to a distal end of the first jaw. The second jaw extends from the second pin to a distal end of the second jaw. Thus, the majority of the lengths of the first jaw and second jaw are positioned forwardly of the first pin and second pin. The first jaw and the second jaw have proximal end portions that extend rearwardly from the first pin and the second pin, respectively.

A single hydraulic actuator is connected between the proximal end portions of the first jaw and the second jaw. The actuator is controlled to move to its retracted condition to cause the first jaw and the second jaw to move to their open positions. The actuator is controlled to move to its extended condition to cause the first jaw and the second jaw to move to their closed positions. With the actuator positioned rearwardly of the first pin and the second pin, the actuator is at a protected position behind the lengths of the first jaw and the second jaw and is not exposed to the pulling and/or digging environment of the apparatus.

The proximal end portions of the first jaw and second jaw are also provided with gear teeth sections. The gear teeth sections of the first jaw and second jaw mesh between the first pin and the second pin. The meshing of the gear teeth sections synchronizes the movements of the first jaw and second jaw as they are moved between their open positions and their closed positions, and between their closed positions and their open positions.

The first jaw is also provided with a generally vertically oriented first set of saw teeth. The first set of saw teeth project upwardly from the length of the first jaw. The second jaw is also provided with a generally vertically oriented second set of saw teeth. The second set of saw teeth project upwardly along the length of the second jaw. The first and second sets of saw teeth are configured to saw through the roots of trees, bushes, etc. when the apparatus is used for digging.

The first jaw is also provided with a key tab that projects from the distal end of the first jaw toward the second jaw. The second jaw is provided with a key hole or key slot at the distal end of the second jaw. When the first and second jaws are moved to their closed positions for a digging operation, the key tab engages in the key slot to securely attach the distal ends of the first and second jaws together and prevent their moving vertically relative to each other during a digging operation.

The first jaw has a straight section of gripping teeth that extend along a substantially straight line as the straight section of teeth extend from the distal end of the first jaw toward the proximal end of the first jaw. The second jaw also has a straight section of gripping teeth that extend along a substantially straight line as the straight section of teeth extend from the distal end of the second jaw toward the proximal end of the second jaw. The straight section of gripping teeth on the first jaw and the straight section of gripping teeth on the second jaw mesh with each other when the first jaw and the second jaw are moved to their closed positions.

The first jaw has a curved section of gripping teeth that extend from the straight section of gripping teeth on the first jaw toward the proximal end of the first jaw. The curved section of gripping teeth on the first jaw extend along a curved line as they extend from the straight section of gripping teeth on the first jaw toward the proximal end of the first jaw. The second jaw is also provided with a curved section of gripping teeth that extend from the straight section of gripping teeth on the second jaw toward the proximal end of the second jaw. The curved section of gripping teeth on the second jaw extend along a curved line as they extend from the straight section of gripping teeth on the second jaw toward the proximal end of the second jaw. The curved section of gripping teeth on the first jaw and the curved section of gripping teeth on the second jaw allow larger objects, for example larger diameter posts or larger diameter trees to be engaged between these sections of teeth near the proximal ends of the jaws and closer to the loader arms of the vehicle for maximizing pulling force.

Further features of the apparatus are disclosed in the following detailed description of the apparatus and in the drawing figures.

DETAILED DESCRIPTION

Figure 1:
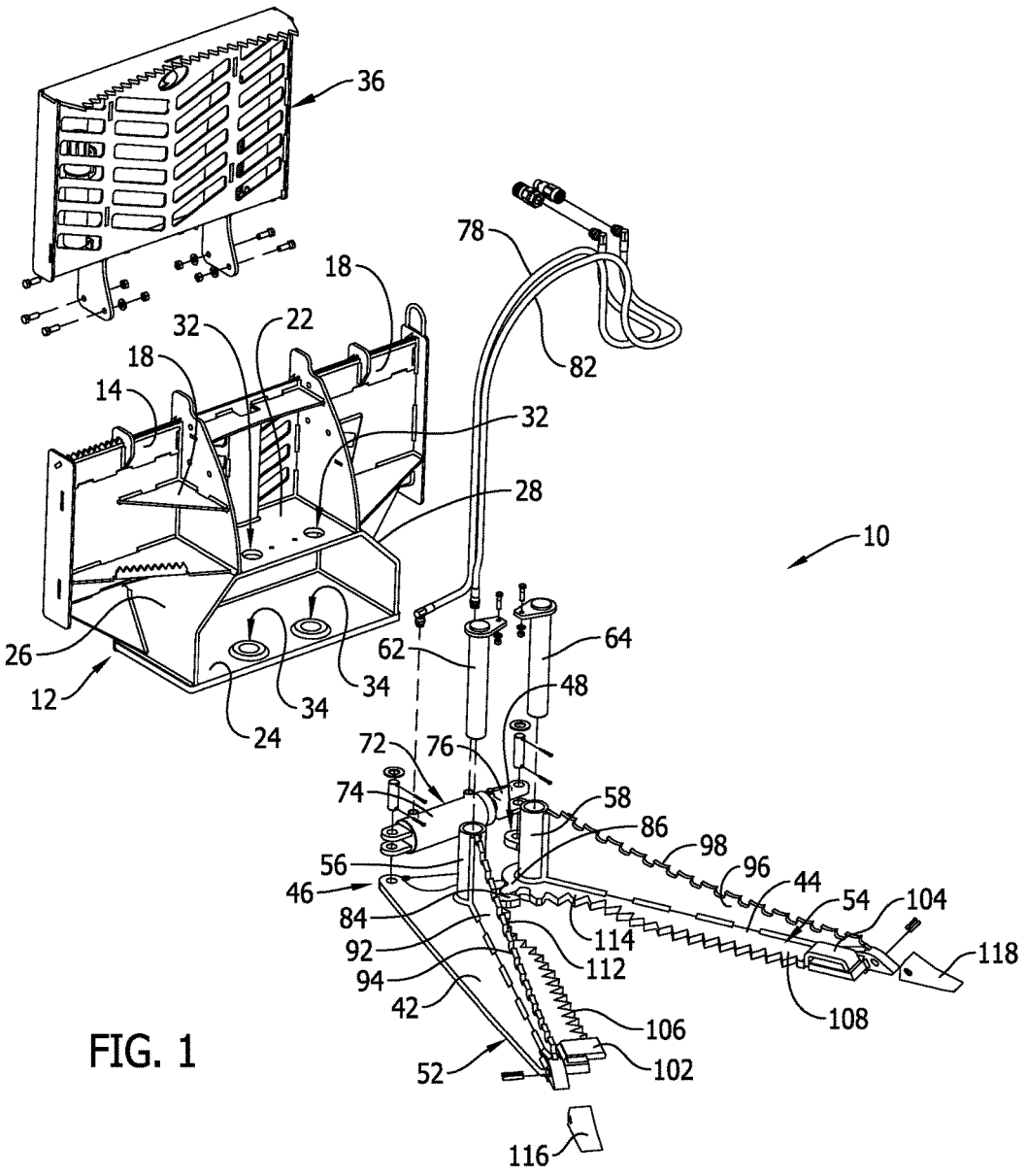
FIG. 1 is an exploded view of the component parts of the apparatus

FIG. 1 is a representation of an exploded view of the component parts of the object lifting, pulling and digging apparatus 10 of this disclosure. Each of the component parts represented in FIG. 1 is constructed of a material that gives the component part sufficient strength for its intended functioning of pulling and digging posts, trees, bushes, etc. from the ground.

Referring to FIGS. 1-4, the apparatus 10 has a base 12 with opposite front 14 and rear 16 surfaces. The rear surface 16 of the base 10 is configured for removable attachment to the loader arms of a vehicle having an auxiliary hydraulic circuit. For example, the rear surface 16 could be attached by a universal quick attach hitch to the loader arms of a "skid steer" type vehicle. With the base 16 attached to the vehicle, the rear surface 16 of the base is directed toward the vehicle and the front surface 14 of the base is directed away from the vehicle. The base 12 is constructed with a plurality of reinforcing panels and gussets 18 on the front surface 14 of the base. The base 12 is also constructed with a reinforced, protective box on the front surface 14 of the base. The box is comprised of a top wall 22, an opposite bottom wall 24, and opposite angled side walls 26, 28. As can be seen in FIG. 1, a pair of pivot holes 32 are formed through the box top wall 22 and a pair of pivot holes 34 are formed through the box bottom wall 24. Each pivot hole 32 through the top wall 22 is coaxial with the pivot hole 34 below it through the bottom wall 34. The axis of the pivot holes 32, 34 are positioned in a single vertically oriented plane relative to the base 12.

A brush guard assembly 36 is attached to the top of the base 12. The brush guard assembly 36 provides protection to the operator of the vehicle to which the apparatus 10 is attached when pulling or digging up posts, trees, bushes, etc. using the apparatus.

Figure 5:
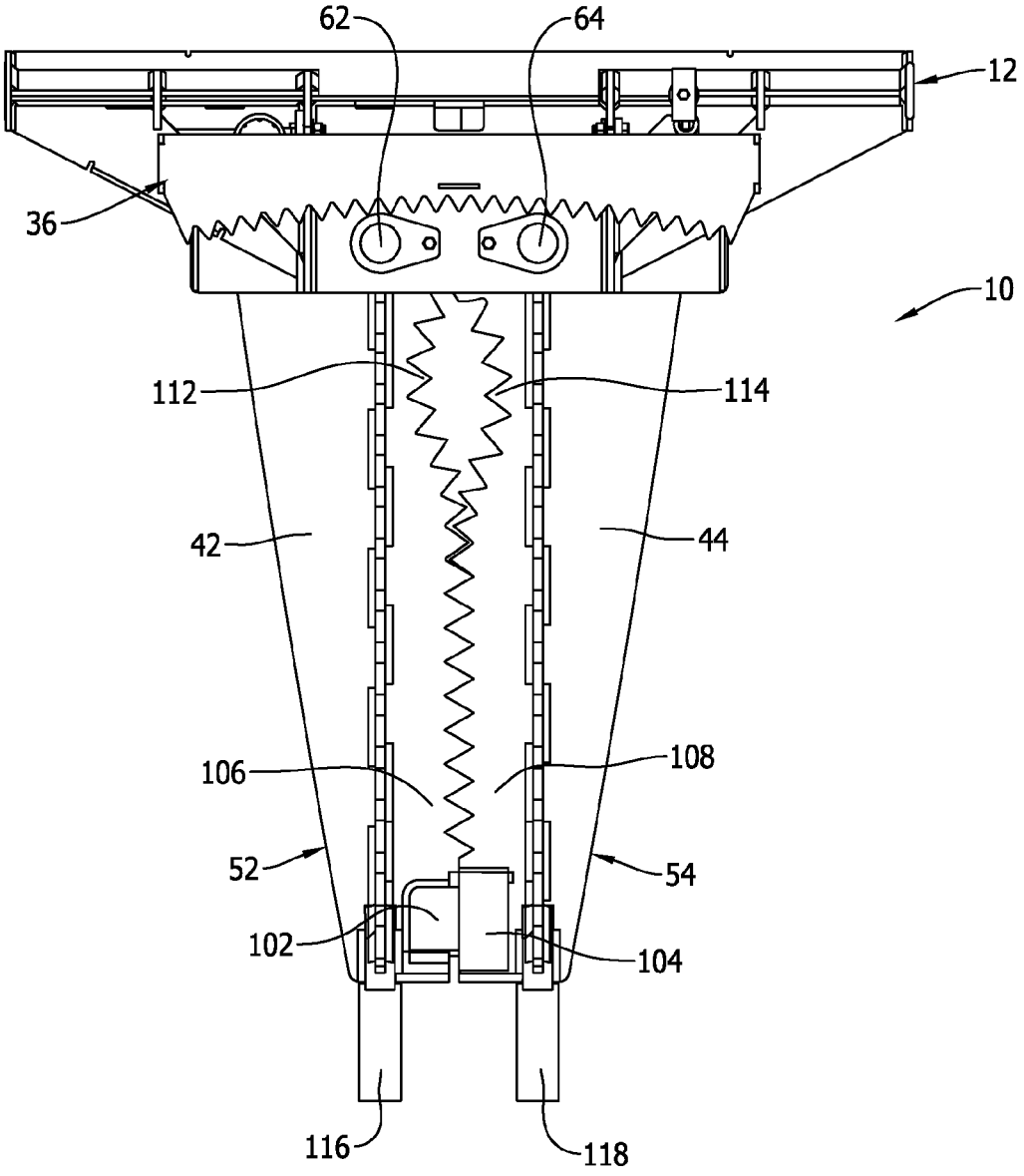
FIG. 5 is a top plan view of the apparatus with the jaws in their closed positions.
Figure 6:
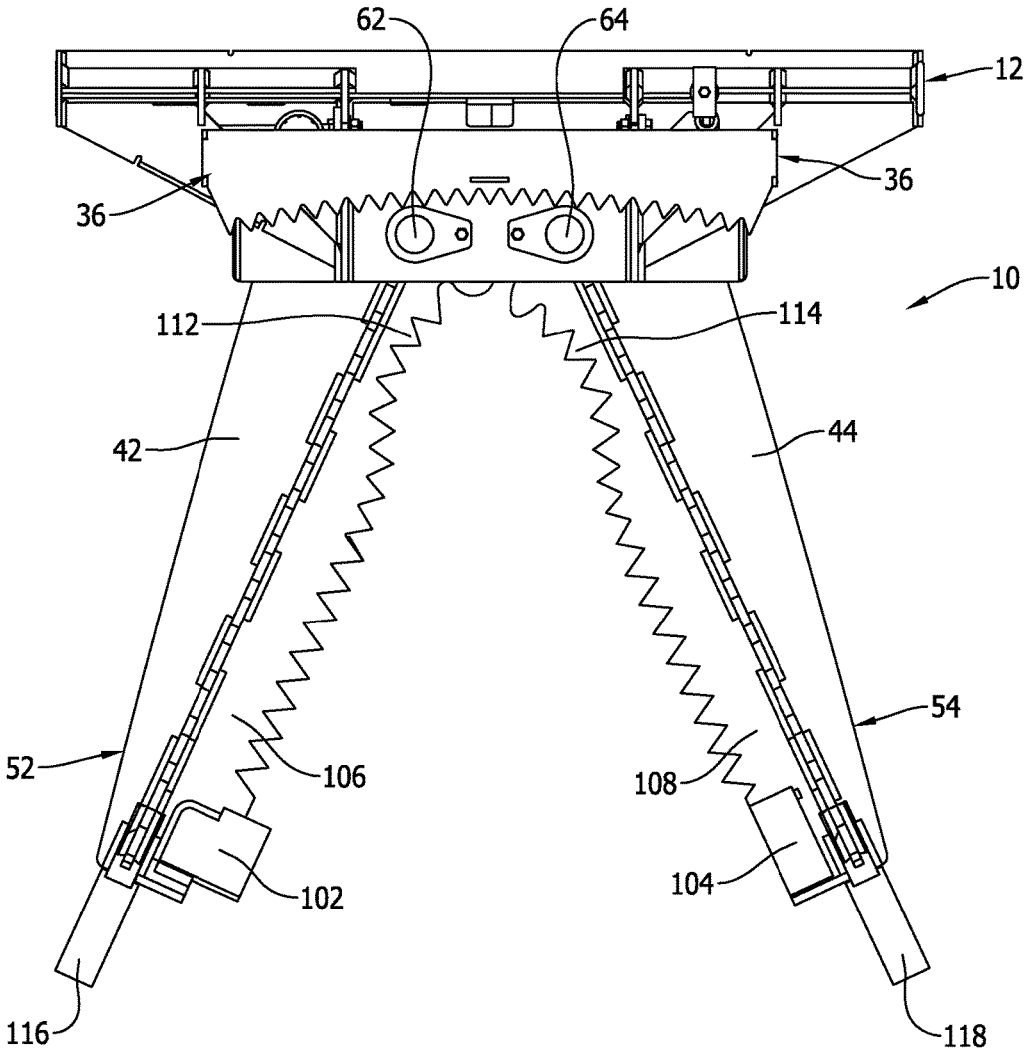
FIG. 6 is a top plan view of the apparatus with the jaws in their open positions.

A first jaw 42 having a length with opposite proximal and distal ends and a second jaw 44 having a length with opposite proximal and distal ends are attached to the front surface 14 of the base 12. Both of the jaws 42, 44 are constructed as generally flat panels having elongate lengths that extend from proximal portions 46, 48 of the respective first 42 and second 44 jaws to distal portions 52, 54 of the respective first 42 and second 44 jaws. As shown in FIGS. 5 and 6, the first jaw 42 is constructed as a single, generally flat panel with an elongate, triangular configuration that extends from an apex of the triangular configuration at the distal end portion 52 of the first jaw 42 to a base of the triangular configuration at the proximal portion 46 of the first jaw 42. The second jaw 44 is also constructed as a single, generally flat panel with an elongate, triangular configuration that extends from an apex of the triangular configuration at the distal end portion 54 of the second jaw 44 to a base of the triangular configuration at the proximal portion 48 of the second jaw 44.

A first cylindrical pivot tube 56 is attached to the first jaw 42. The pivot tube 56 has an interior bore that extends completely through the pivot tube and through the first jaw 42. The pivot tube 56 separates the first proximal portion 46 and the first distal portion 52 of the first jaw 42 with a majority of the length of the first jaw extending along the first distal portion 52 forwardly from the first pivot tube 56.

A second pivot tube 58 is attached to the second jaw 44. The second pivot tube 58 also has an interior bore that extends completely through the second pivot tube and through the second jaw 44. The second pivot tube 58 separates the second proximal portion 48 and from the second distal end 54 of the second jaw 44 with a majority of the length of the second jaw 44 extending along the second distal portion 54 forwardly from the second pivot tube 58.

A first pin 62 connects the first jaw 42 to the front surface 14 of the base 12 for pivoting movement of the first jaw about the first pin between an open position and a closed position of the first jaw relative to the base. The first pin 62 extends through the pivot hole 32 through the top wall shown to the left in FIG. 1, through the first pivot tube 56 and into the pivot hole 34 in the bottom wall shown to the left in FIG. 1. The first pivot pin 62 is secured to the box top wall 22 to prevent rotation of the pin relative to the base 12.

A second pin 62 connects to the second jaw 44 to the front surface 14 of the base 12 for pivoting movement of the second jaw about the second pin between an open position and a closed position of the second jaw relative to the base. The second pin 64 extends through the pivot hole 32 in the box top wall 22 shown to the right in FIG. 1, through the second pivot tube 58 and into the pivot hole 34 through the box bottom wall 24 shown to the right in FIG. 1. The first pin 62 and the second pin 64 are positioned on the base 12 in a single, generally vertical plane relative to the base. The first distal portion 52 of the first jaw 42 extends forwardly from the first pivot pin 62. The first proximal portion 46 of the first jaw 42 extends rearwardly of the first pivot pin 62. The second distal portion 54 of the second jaw 44 extends forwardly from the second pivot pin 64. The second proximal portion 48 of the second jaw 44 extends rearwardly of the second pivot pin 64. Thus, the majority of the length of the first jaw 42 and the second jaw 44 are positioned forwardly of the first pin 62 and the second pin 64.

A single linear actuator 72 is connected between the first proximal portion 46 of the first jaw 42 and the second proximal portion 48 of the second jaw 44. The actuator 72 shown in FIG. 1 is a hydraulic actuator. However, any equivalent type of linear actuator could be connected between the first proximal portion 46 of the first jaw 42 and the second proximal portion 48 of the second jaw 44. The actuator 72 has a conventional construction with a housing 74 at one end of the actuator and a rod 76 at the opposite end of the actuator. A pair of hydraulic hoses 78, 82 extend from the opposite sides of the actuator housing 74. The hoses 78, 82 communicate the actuator housing 74 with the auxiliary hydraulics of the vehicle with which the apparatus 10 is used. When the actuator 72 is operated to cause the housing 74 and rod 76 to move to their extended condition, the first jaw 42 and second jaw 44 are moved to their closed positions. When the actuator 72 is operated to cause the housing 74 and rod 76 to move to their retracted condition, the first jaw 42 and second jaw 44 are moved to their open positions. With the actuator 72 positioned rearwardly of the first pin 62 and second pin 64, the actuator is positioned rearwardly of the first jaw 42 and second jaw 44 and away from the pulling or digging operation performed by the apparatus 10. The actuator 72 is also positioned in the protective box comprised of the top wall 22, the bottom wall 24 and the opposite side walls 26, 28. Thus, the actuator 72 is protected from the pulling and/or digging environment of the apparatus 10 in use.

The first proximal portion 46 of the first jaw 42 is formed with a first gear tooth section 84. The second proximal portion 48 of the second jaw 44 is formed with a second gear tooth section 86. These can be seen in FIG. 1. The first gear tooth section 84 of the first jaw 42 and the second gear tooth section 86 of the second jaw 44 mesh between the first pivot pin 62 and the second pivot pin 64. The meshing of the first gear tooth section 84 and the second gear tooth section 86 synchronizes the movements of the first jaw 42 and the second jaw 44 as they are moved between their open positions and their closed positions, and between their closed positions and their open positions. The first jaw 42 cannot be moved without the second jaw 44 also moving, and the second jaw 44 cannot be moved without the first jaw 42 also moving.

Figure 2:
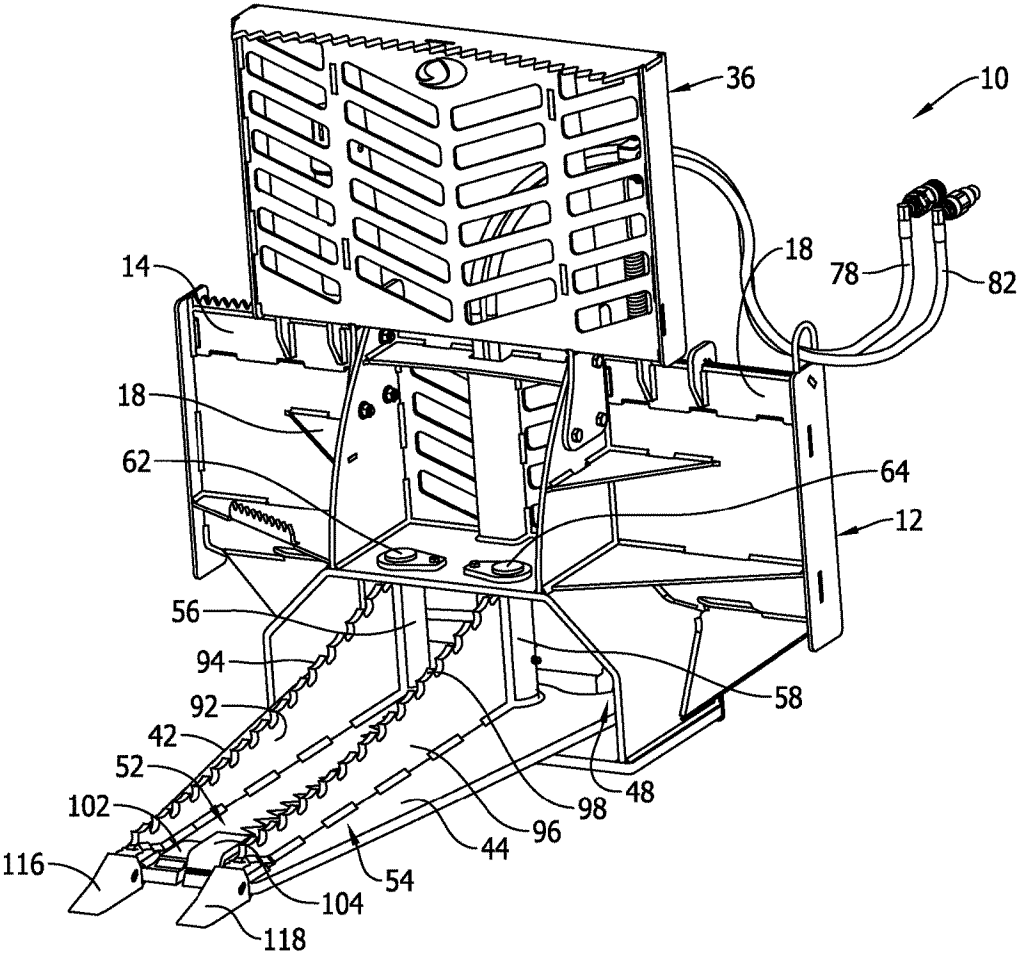
FIG. 2 is a front perspective view of the apparatus.
Figure 3:
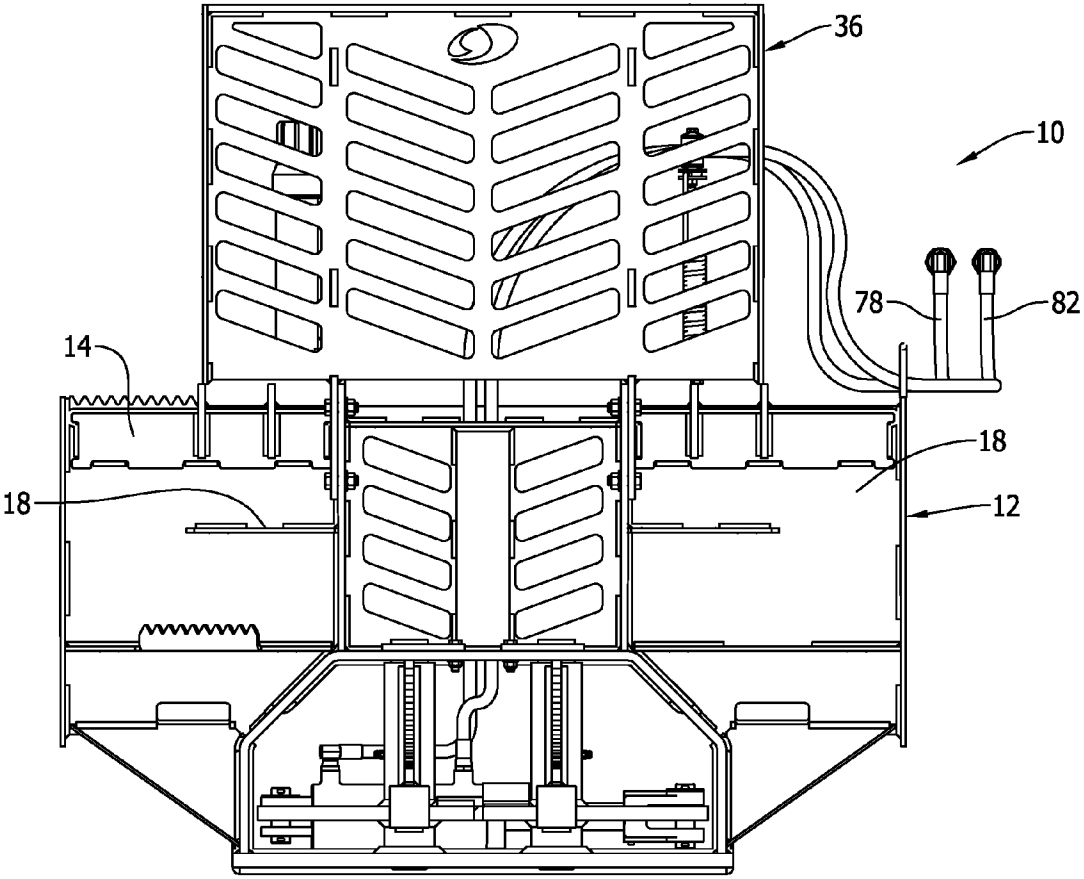
FIG. 3 is a front elevation view of the apparatus.
Figure 4:
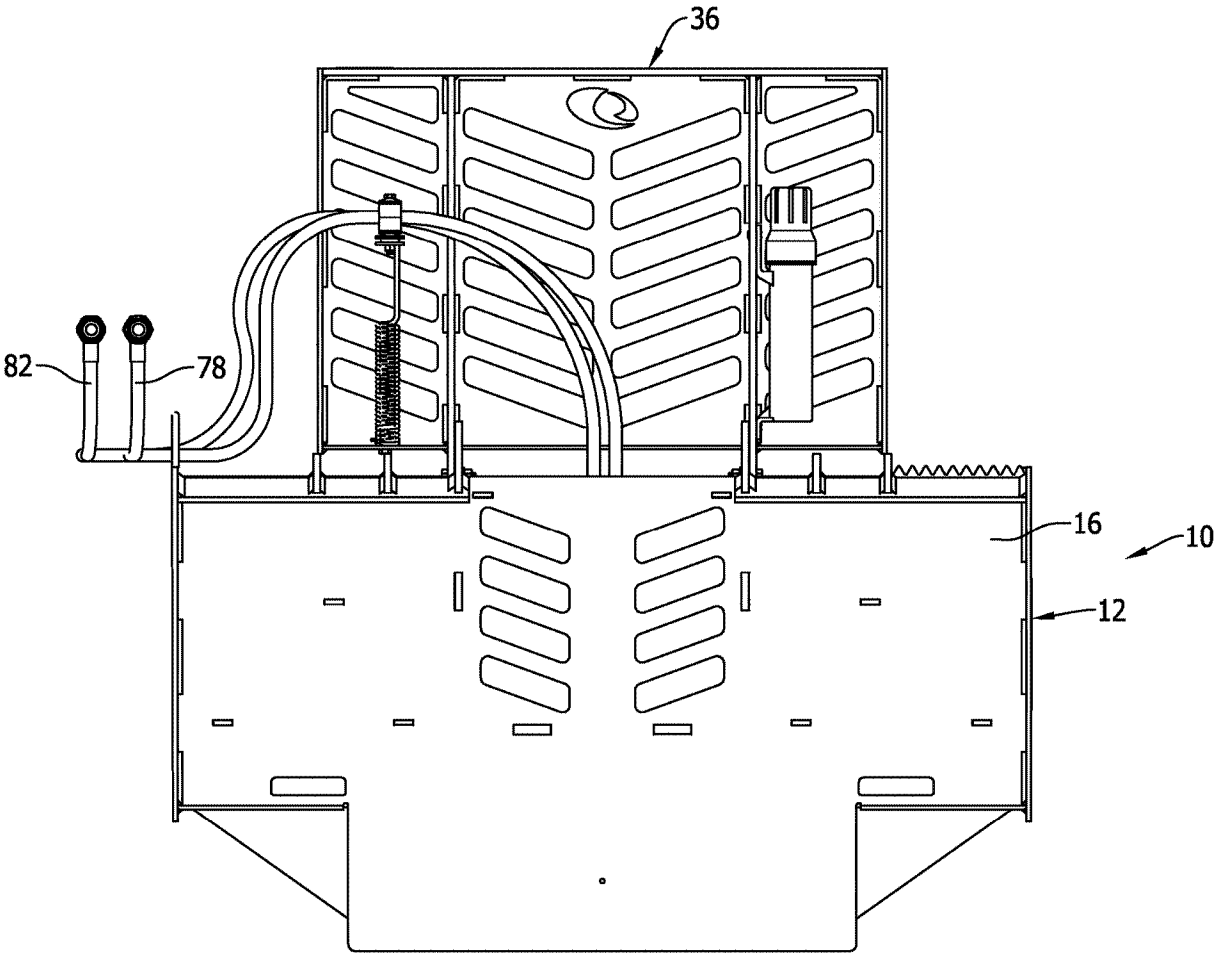
FIG. 4 is a rear elevation view of the apparatus.
Figure 7:
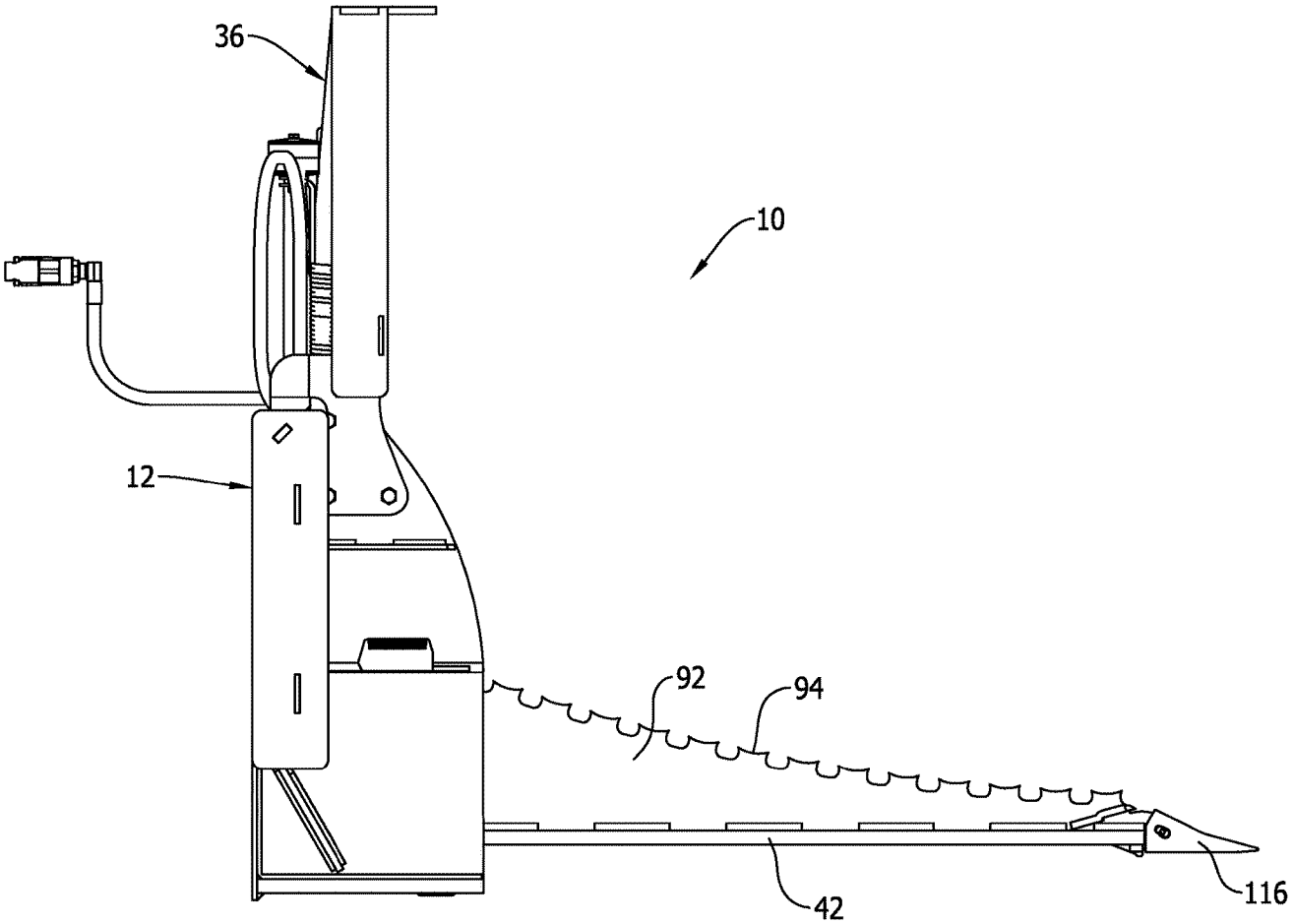
FIG. 7 is a right side elevation view of the apparatus.
Figure 8:
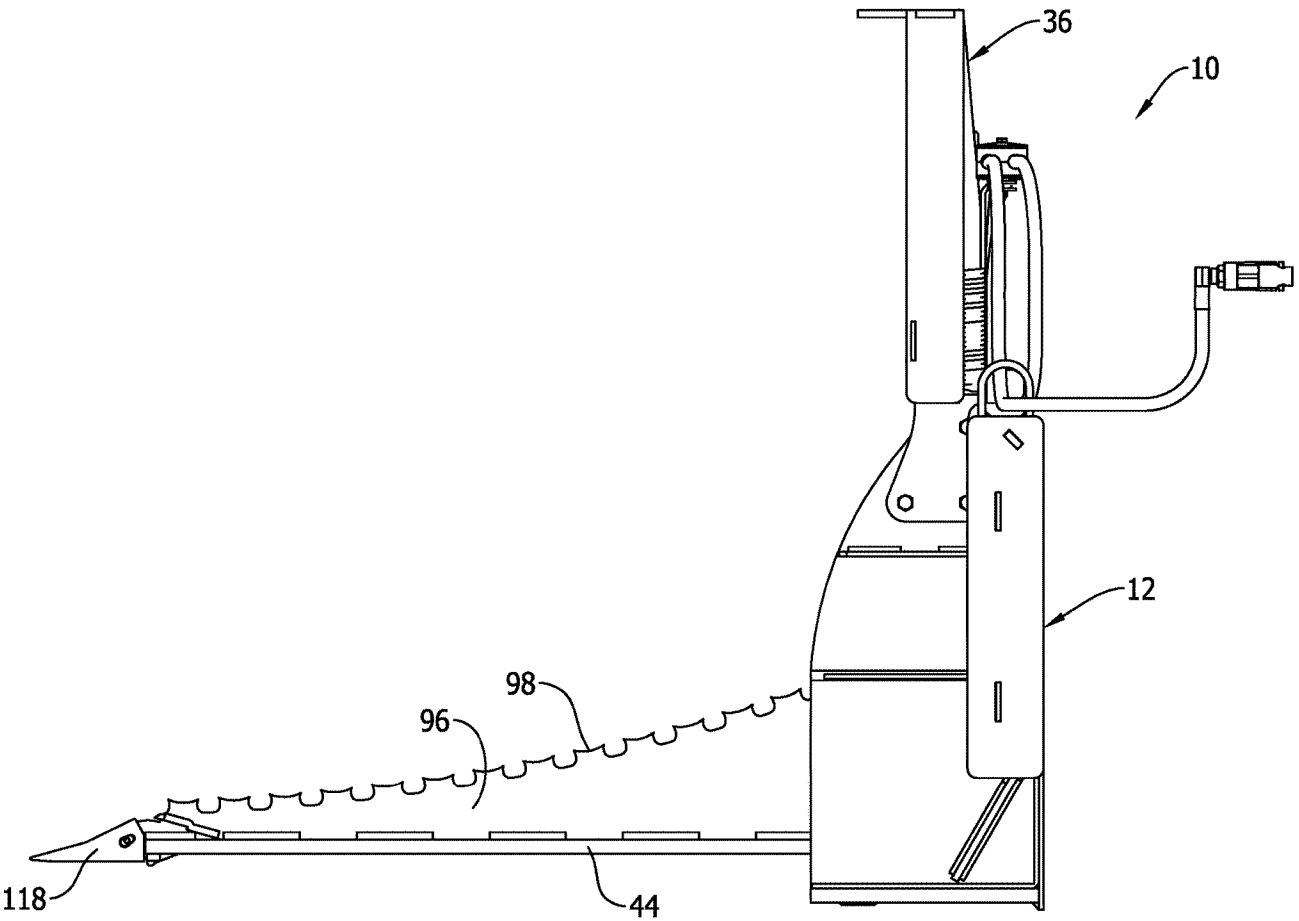
FIG. 8 is a left side elevation view of the apparatus.

The first distal portion 52 of the first jaw 42 is formed with a generally vertically oriented first saw tooth section 92. The first saw tooth section 92 is constructed as a single, generally flat panel with an elongate, triangular configuration that extends from an apex at the distal end of the triangular configuration of the first saw tooth section 92 adjacent the apex of the triangular configuration of the first jaw 42, to a base of the triangular configuration of the first saw tooth section 92 at a proximal portion of the first saw tooth section adjacent the proximal portion 46 of the first jaw 42. The first saw tooth section 92 is secured to the top surface of the first jaw 42 and projects vertically upward from the length of the first jaw 42 as can be seen in FIGS. 1, 2 and 7. As can be seen in FIGS. 1, 2 and 7, as the first saw tooth section 92 extends along the first distal portion 52 of the first jaw 42 from the distal end of the first jaw toward the first pivot tube 56, a line of saw teeth 94 on the first saw tooth section 92 are positioned further away from the first jaw 42 by the first saw tooth section 92. The second distal portion 54 of the second jaw 44 is also formed with a generally vertically oriented second saw tooth section 96. The second saw tooth section 96 is constructed as a single, generally flat panel with an elongate, triangular configuration that extends from an apex at a distal end of the triangular configuration of the second saw tooth section 96 adjacent the apex of the triangular configuration of the second jaw 44, to a base of the triangular configuration of the second saw tooth section 96 at a proximal portion of the second saw tooth section 92 adjacent the proximal portion 48 of the second jaw 44. The second saw tooth section 96 is secured to the top surface of the second jaw 44 and projects vertically upwardly from the length of the second jaw 44. As can be seen in FIGS. 1, 2 and 8, as the second saw tooth section 96 extends along the second distal portion 54 of the second jaw 44 from the distal end of the second jaw toward the second pivot tube 58, a line of second saw teeth 98 on the second saw tooth section 96 is positioned further away from the second jaw 44. The first saw tooth section 92 and the second saw tooth section 96 are configured to saw through roots of trees, bushes, etc. when the apparatus 10 is used for digging. With the first jaw 42 and the second jaw 44 positioned in their closed position as represented in FIG. 5, the first saw tooth section 92 and the second saw tooth section 94 extend parallel across the respective first jaw 42 and second jaw 44. With the first saw teeth 94 extending further away from the first jaw 42 as they extend toward the first pivot tube 56 and the second saw teeth 98 extending further away from the second jaw 44 as they extend to the second pivot tube 58, as the jaws are pushed into the ground by the loader arms of the vehicle with which the apparatus 10 is used the flat, planar jaws 42, 44 prevent the saw teeth 94, 98 from moving away from the roots and the saw teeth 94, 98 continue to cut through the roots of trees, bushes, etc. as the lengths of the draws 42, 44 are pushed further into the ground.

Referring to FIGS. 1, 2, 5 and 6, the first jaw 42 is provided with a key tab 102 that projects from the distal end of the first jaw toward the second jaw 44. The second jaw 44 is provided with a key hole or key slot 104 at the distal end of the second jaw. When the first 42 and second 44 jaws are moved to their closed positions for a digging operation, the key tab 102 engages inside the key slot 104 to securely attach the distal ends of the first 42 and second 44 jaws together and prevent their moving vertically relative to each other during a digging operation. The engagement of the key tab 102 into the key slot 104 can be seen in FIGS. 2 and 5.

Referring to FIGS. 1 and 6, the first jaw 42 has a straight section of gripping teeth 106 that extend along a substantially straight line as the straight section of teeth extend from the distal end of the first jaw toward the proximal end of the first jaw. The second jaw 44 also has a straight section of gripping teeth 108 that extend along a substantially straight line as the straight section of teeth extend from the distal end of the second jaw toward the proximal end of the second jaw. The straight section of gripping teeth 106 on the first jaw 42 and the straight section of gripping teeth 108 on the second jaw 44 mesh with each other when the first jaw and the second jaw are moved to their closed positions. This can be seen in FIG. 5.

Referring to FIGS. 1, 5 and 6, the first jaw 42 also has a curved section of gripping teeth 112. The curved section of gripping teeth 112 on the first jaw 42 extend from the straight section of gripping teeth 106 on the first jaw toward the proximal end of the first jaw. The curved section of gripping teeth 112 on the first jaw 42 extend along a curved line as they extend from the straight section of gripping teeth 106 on the first jaw toward the proximal end of the first jaw. The second jaw 44 is also provided with a curved section of gripping teeth 114. The curved section of gripping teeth 114 extend from the straight section of gripping teeth 108 of the second jaw 44 toward the proximal end of the second jaw. The curved section of gripping teeth 114 on the second jaw 44 extend along a curved line as they extend from the straight section of gripping teeth 108 on the second jaw toward the proximal end of the second jaw. The curved section of gripping teeth 112 on the first jaw 42 and the curved section of gripping teeth 114 on the second jaw 44 allow larger objects, for example larger diameter posts, larger diameter trees, large rocks, etc. to be engaged between the sections of gripping teeth near the proximal ends of the jaws 42, 44 and closer to the loader arms of the vehicle with which the apparatus 10 is used for a maximized pulling and lifting force.

Referring to FIGS. 1, 2 and 5-8, a first tooth 14 is removably attached to the distal end of the first jaw 42 and a second tooth 118 is removably attached to the distal end of the second jaw 44. The teeth 116, 118 represented in the drawing figures are replaceable, excavator style digging teeth. Other types of digging teeth could be employed instead of those shown. With the teeth 116, 118 being replaceable, they can be replaced when worn after several digging operations.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

What is claimed:

1. An object lifting, pulling and digging apparatus comprising:

a base;

a first jaw having a length with opposite proximal and distal ends, the first jaw [being constructed as] *pivotally coupled to the base and including* a single, generally flat panel with an elongate, triangular configuration that extends from an apex of the triangular configuration at the distal end of the first jaw to a base of the triangular configuration at a proximal portion of the first jaw adjacent the proximal end of the first jaw;

a second jaw having a length with opposite proximal and distal ends, the second jaw [being constructed as] *pivotally coupled to the base and including* a single, generally flat panel with an elongate, triangular configuration that extends from an apex of the triangular configuration at the distal end of the second jaw to a base of the triangular configuration at a proximal portion of the second jaw adjacent the proximal end of the second jaw,

[a first pin connecting the first jaw to the base adjacent the proximal end of the first jaw for pivoting movement of the first jaw about the first pin relative to the base;

a second pin connecting the second jaw to the base adjacent the proximal end of the second jaw for pivoting movement of the second jaw about the second pin relative to the base;]

a first saw tooth section secured on a top surface of the first jaw, the first saw tooth section projecting vertically upwardly from the length of the first jaw, the first saw tooth section being constructed as a single, generally *flat* panel with an elongate, triangular configuration that extends from an apex at a distal end of the triangular configuration of the first saw tooth section adjacent the apex of the triangular configuration of the first jaw, to a base of the triangular configuration of the first saw tooth section at a proximal portion of the first saw tooth section adjacent the proximal portion of the first jaw;

a second saw tooth section secured to a top surface of the second jaw, the second saw tooth section projecting vertically upwardly from the length of the second jaw, the second saw tooth section being constructed as a single, generally flat panel with an elongate, triangular configuration that extends from an apex at a distal end of the triangular configuration of the second saw tooth section adjacent the apex of the triangular configuration of the second jaw, to a base of the triangular configuration of the second saw tooth section at a proximal portion of the second saw tooth section adjacent the proximal portion of the second jaw; and, an actuator [connected to at least one of the first jaw and the second jaws] *configured to pivot at least one of the first jaw or the second jaw relative to the base.*

2. The apparatus of claim 1, further comprising:

[the] *a* first pin connecting the first jaw to the base for pivoting movement of the first jaw about the first pin between a closed position of the first jaw relative to the base and an open position of the first jaw relative to the base;

[the] *a* second pin connecting the second jaw to the base for pivoting movement of the second jaw about the second pin between a closed position of the second jaw relative to the base and an open position of the second jaw relative to the base;

the first jaw has a straight section of gripping teeth and a curved section of gripping teeth;

the second jaw has a straight section of gripping teeth and a curved section of gripping teeth; and, the straight section of gripping teeth of the first jaw engage with the straight section of gripping teeth of the second jaw when the first jaw and the second jaw are in their closed positions relative to the base and the curved section of gripping teeth of the first jaw and the curved section of gripping teeth of the second jaw do not engage with each other when the first jaw and the second jaw are moved to their closed positions relative to the base.

3. The apparatus of claim 2, further comprising:

the curved section of gripping teeth of the first jaw being arranged along a curved line; and, the curved section of gripping teeth of the second jaw being arranged along a curved line.

4. The apparatus of claim 1, further comprising:

the actuator having a housing at one end of the actuator and a rod at an opposite end of the actuator, the housing being [connected] *coupled* to the first jaw and the rod being [connected] *coupled* to the second jaw.

5. The apparatus of claim 1, further comprising:

a first digging tooth removably attached to the first jaw; and, a second digging tooth removably attached to the second jaw.

6. The apparatus of claim 1, further comprising:

a first set of saw teeth on the first saw tooth section projecting generally vertically from the first jaw, a vertical projection of the first set of saw teeth from the first jaw increases as the first set of saw teeth extends from the distal end of the first jaw toward the first pin; and, a second set of saw teeth on the second saw tooth section projecting generally vertically from the second jaw, a vertical projection of the second set of saw teeth from the second jaw increases as the second set of saw teeth extends from the distal end of the second jaw toward the second pin.

7. The apparatus of claim 1, further comprising:

a first set of gear teeth on the first jaw; and, a second set of gear teeth on the second jaw, the first set of gear teeth and the second set of gear teeth meshing with each other.

8. The apparatus of claim 1, further comprising:

a protective box on the base, the protective box having a top wall, a bottom wall opposite the top wall, a first side wall extending between the top wall and the bottom wall on one side of the protective box, a second side wall extending between the top wall and the bottom wall on a second, opposite side of the protective box; and, the actuator is positioned in the protective box and is protected by the protective box from the environment of the apparatus in use.

9. The apparatus of claim 1, further comprising:

[the] *a* first pin connecting the first jaw to the base for pivoting movement of the first jaw about the first pin between a closed position of the first jaw relative to the base and an open position of the first jaw relative to the base;

[the] *a* second pin connecting the second jaw to the base for pivoting movement of the second jaw about the second pin between a closed position of the second jaw relative to the base and an open position of the second jaw relative to the base;

a key tab on one of the first jaw and the second jaw;

a key slot on an other of the first jaw and the second jaw; and, the key tab and the key slot being configured where with the first and second jaws moved to their closed positions for a digging operation, the key tab engages inside the key slot and securely attaches the first jaw and the second jaw together and prevents their moving relative to each other during a digging operation.

10. An object lifting, pulling and digging apparatus comprising:

a base;

a first jaw having a length with opposite proximal and distal ends, the first jaw [being constructed as] *pivotally coupled to the base and including* a single, generally flat panel with an elongate, triangular configuration that extends from an apex of the triangular configuration at the distal end of the first jaw to a base of the triangular configuration at a proximal portion of the first jaw adjacent the proximal end of the first jaw;

a second jaw having a length with opposite proximal and distal ends the second jaw [being constructed as] *pivotally coupled to the base and including* a single, generally flat panel with an elongate, triangular configuration that extends from an apex of the triangular configuration at the distal end of the second jaw to a base of the triangular configuration at a proximal portion of the second jaw adjacent the proximal end of the second jaw;

[a first pin connecting the first jaw to the base adjacent the proximal end of the first jaw for pivoting movement of the first jaw about the first pin relative to the base;

a second pin connecting the second jaw to the base adjacent the proximal end of the second jaw for pivoting movement of the second jaw about the second pin relative to the base;]

a first saw tooth section secured on a [too] *top* surface of the first jaw, the first saw tooth section projecting vertically upwardly from the length of the first jaw, the first saw tooth section being constructed as a single, generally flat panel with an elongate, triangular configuration that extends from an apex at a distal end of the triangular configuration of the first saw tooth section adjacent the apex of the triangular configuration of the first jaw, to a base of the triangular configuration of the first saw tooth section at a proximal portion of the first saw tooth section adjacent the proximal portion of the first jaw;

a second saw tooth section secured to a top surface of the second jaw, the second saw tooth section projecting vertically upwardly from the length of the second jaw, the second saw tooth section being constructed as a single, generally flat panel with an elongate, triangular configuration that extends from an apex at a distal end of the triangular configuration of the second saw tooth section adjacent the apex of the triangular configuration of the second jaw, to a base of the triangular configuration of the second saw tooth section at a proximal portion of the second saw tooth section adjacent the proximal portion of the second jaw;

an actuator [connected] *coupled* to at least one of the first jaw and the second jaw;

a first gear tooth section [on] *positioned proximate to the base and rotating in concert with* the first jaw;

a second gear tooth section [on] *positioned proximate to the base and rotating in concert with* the second jaw; and, the first gear tooth section and the second gear tooth section being in mesh.

11. The apparatus of claim 10, further comprising:

the first pin connecting the first jaw to the base for pivoting movement of the first jaw about the first pin between a closed position of the first jaw relative to the base and an open position of the first jaw relative to the base;

the second pin connecting the second jaw to the base for pivoting movement of the second jaw about the second pin between a closed position of the second jaw relative to the base and an open position of the second jaw relative to the base;

the first jaw has a straight section of gripping teeth and a curved section of gripping teeth;

the second jaw has a straight section of gripping teeth and a curved section of gripping teeth; and, the straight section of gripping teeth of the first jaw engage with the straight section of gripping teeth of the second jaw when the first jaw and the second jaw are in their closed positions relative to the base and the curved section of gripping teeth of the first jaw and the curved section of gripping teeth of the second jaw do not engage with each other when the first jaw and the second jaw are moved to their closed positions relative to the base.

12. The apparatus of claim 10, further comprising:

a first digging tooth removably attached to the first jaw; and, a second digging tooth removably attached to the second jaw.

13. The apparatus of claim 10, further comprising:

a first set of saw teeth on the first saw tooth section projecting generally vertically from the first jaw, a vertical projection of the first set of saw teeth from the first jaw increases as the first set of saw teeth extends from the distal end of the first jaw toward the first pin; and, a second set of saw teeth on the second saw tooth section projecting generally vertically from the second jaw, a vertical projection of the second set of saw teeth from the second jaw increases as the second set of saw teeth extends from the distal end of the second jaw toward the second pin.

14. The apparatus of claim 10, further comprising:

a protective box on the base, the protective box having a top wall, a bottom wall opposite the [too] *top* wall, a first side wall extending between the [too] *top* wall and the bottom wall on one side of the protective box, a second side wall extending between the [too] *top* wall and the bottom wall on a second, opposite side of the protective box; and, the actuator is positioned in the protective box and is protected by the protective box from the environment of the apparatus in use.

15. The apparatus of claim 10, further comprising:

the first pin connecting the first jaw to the base for pivoting movement of the first jaw about the first pin between a closed position of the first jaw relative to the base and an open position of the first jaw relative to the base;

the second pin connecting the second jaw to the base for pivoting movement of the second jaw about the second pin between a closed position of the second jaw relative to the base and an open position of the second jaw relative to the base;

a key tab on one of the first jaw and the second jaw;

a key slot on an other of the first jaw and the second jaw; and, the key tab and the key slot being configured where with the first and second jaws move to their closed positions for a digging operation, the key tab engages inside the key slot to securely attach the first jaw and the second jaw together and prevent their moving relative to each other during a digging operation.

16. An object lifting, pulling and digging apparatus comprising:

a base;

a first jaw having a length with opposite proximal and distal ends, the first jaw having a straight section of gripping teeth and a curved section of gripping teeth, first jaw *pivotally coupled to the base and having a section* being constructed as a single, generally flat panel with an elongate, triangular configuration that extends from an apex of the triangular configuration at the distal end of the first jaw to a base of the triangular configuration at a proximal portion of the first jaw adjacent the proximal end of the first jaw;

a second jaw having a length with opposite proximal and distal ends, the second jaw having a straight section of gripping teeth and a curved section of gripping teeth, the second jaw *pivotally coupled to the base and having a section* being constructed as a single, generally flat panel with an elongate, triangular configuration that extends from an apex of the triangular configuration at the distal end of the second jaw to a base of the triangular configuration at a proximal portion of the second jaw adjacent the proximal end of the second jaw;

[a first pin connecting the first jaw to the base adjacent the proximal end of the first jaw for pivoting movement of the first jaw about the first pin relative to the base;

a second pin connecting the second jaw to the base adjacent the proximal end of the second jaw for pivoting movement of the second jaw about the second pin relative to the base;]

a first saw tooth section secured on a [too] *top* surface of the first jaw, the first saw tooth section projecting vertically upwardly from the length of the first jaw, the first saw tooth section being constructed as a single, generally flat panel with an elongate, triangular configuration that extends from an apex at a distal end of the triangular configuration of the first saw tooth section adjacent the apex of the triangular configuration of the first jaw, to a base of the triangular configuration of the first saw tooth section at a proximal portion of the first saw tooth section adjacent the proximal portion of the first jaw;

a second saw tooth section secured to a [too] *top* surface of the second jaw, the second saw tooth section projecting vertically upwardly from the length of the second jaw, the second saw tooth section being constructed as a single, generally flat panel with an elongate, triangular configuration that extends from an apex at a distal end of the triangular configuration of the second saw tooth section adjacent the apex of the triangular configuration of the second jaw, to a base of the triangular configuration of the second saw tooth section at a proximal portion of the second saw tooth section adjacent the proximal portion of the second jaw; and, an actuator [connected to at least one of the first jaw and the second jaw] *configured to selectively pivot the first jaw relative to the second jaw*.

17. The apparatus of claim 16, further comprising:

a first set of saw teeth projecting generally vertically from the first jaw, a vertical projection of the first set of saw teeth from the first jaw increases as the first set of saw teeth extends from the distal end of the first jaw toward [the] *a* first pin *pivotally coupling the first jaw to the base*; and, a second set of saw teeth projecting generally vertically from the second jaw, a vertical projection of the second set of saw teeth from the second jaw increases as the second set of saw teeth extends from the distal end of the second jaw toward [the] *a* second pin *pivotally coupling the second jaw to the base*.

18. The apparatus of claim 16, further comprising:

a first set of gear teeth on the first jaw; and, a second set of gear teeth on the second jaw, the first set of gear teeth and the second set of gear teeth meshing with each other.

19. The apparatus of claim 16, further comprising:

a protective box on the base, the protective box having a top wall, a bottom wall opposite the [too] *top* wall, a first side wall extending between the top wall and the bottom wall on one side of the protective box, a second side wall extending between the top wall and the bottom wall on a second, opposite side of the protective box; and, the actuator is positioned in the protective box and is protected by the protective box from the environment of the apparatus in use.

20. The apparatus of claim 16, further comprising:

[the] *a* first pin connecting the first jaw to the base for pivoting movement of the first jaw about the first pin between a closed position of the first jaw relative to the base and an open position of the first jaw relative to the base;

[the] *a* second pin connecting the second jaw to the base for pivoting movement of the second jaw about the second pin between a closed position of the second jaw relative to the base and an open position of the second jaw relative to the base;

a key tab on one of the first jaw and the second jaw;

a key slot on an other of the first jaw and the second jaw; and, the key tab and the key slot being configured where with the first and second jaws move to their closed positions for a digging operation, the key tab engages inside the key slot to securely attach the first jaw and the second jaw together and prevent their moving relative to each other during a digging operation.

* * * * *